F. W. TULLY.
TEA BALL.
APPLICATION FILED NOV. 16, 1916.
1,247,906. Patented Nov. 27, 1917.
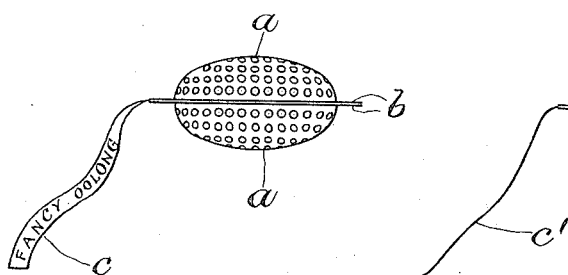
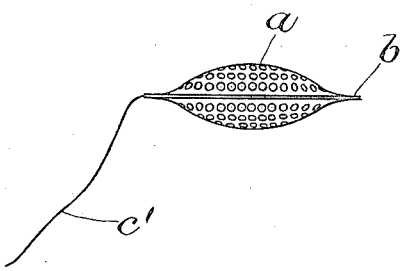
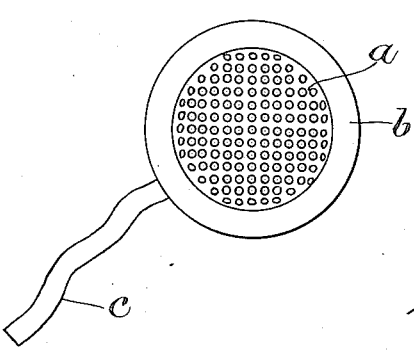
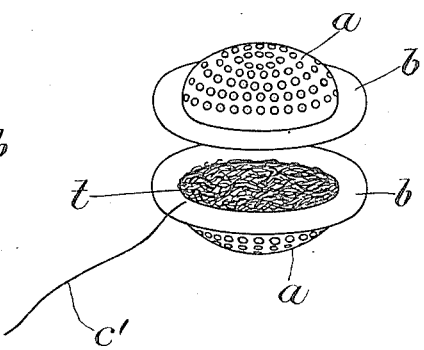
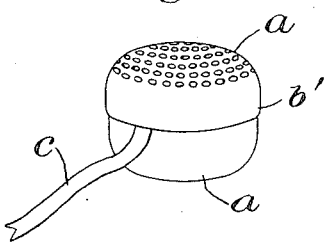
Inventor:
Francis W. Tully,
by Roberts, Roberts & Cushman
Attorneys.

UNITED STATES PATENT OFFICE.

FRANCIS W. TULLY, OF BROOKLINE, MASSACHUSETTS.

TEA-BALL.

1,247,906.  Specification of Letters Patent.  Patented Nov. 27, 1917.

Application filed November 16, 1916. Serial No. 131,764.

*To all whom it may concern:*

Be it known that I, FRANCIS W. TULLY, a citizen of the United States, and resident of Brookline, in the county of Norfolk and State of Massachusetts, have invented new and useful Improvements in Tea-Balls, of which the following is a specification.

This invention relates to the manufacture of tea balls, and its object is to provide a convenient, economical, attractive and hygienic package for holding tea, in which the tea may be put up both for marketing it and for brewing it.

Tea is commonly brewed in a teapot, or by means of a metal tea ball, or by means of a percolator. Each of these modes is open to many objections, particularly where the tea is made on a large scale as in hotels or for large gatherings of people. There is the initial cost of the utensils; their repair and replacement; their service and upkeep. And there is the handling of the tea, and the waste due to handling and to the frequent use and service of more than is necessary for the desired brew.

Under the present invention tea is put up in small packages, suitable for individual service, and in attractive and appetizing form ready for brewing the beverage without any handling of the tea leaves.

In the accompanying drawings which illustrate the invention,—

Figure 1 is a side elevation of a tea ball embodying my invention;

Fig. 2 is a plan view;

Fig. 3 is a perspective view of the two sections about to be assembled;

Fig. 4 is a side view illustrating another form of the invention; and

Fig. 5 is a perspective view of still another form.

The ball as illustrated in Figs. 1 to 4, is made in two sections of paper, papier mâché, textile fabric, or similar fibrous material, cut, pressed or embossed, and perforated, to form a perforated crown or concavo-convex body $a$, and a flange-like rim $b$.

In order that the tea ball may withstand hot or boiling water, I coat each section with a waterproofing, heat-resisting and cementitious substance, preferably a solution of cellulose acetate. This coating makes the article waterproof and heat-proof, acts as a cement to fasten the two sections together, toughens the paper and gives it a glossy and attractive appearance, and in no wise affects the taste or quality of the beverage.

In making the package of tea, the two sections are coated separately; one section is permitted to dry and when dry is filled with tea leaves $t$. Sufficient space is afforded by the other section to permit the tea to expand upon saturation. The other section is then applied while its coating of cellulose acetate solution or other waterproofing, heat-resisting, cementitious substance is still wet, to the filled, dry section, rim to rim, and when the assembled article is dry the two sections will be firmly cemented together by the same waterproof and heat-proof substance with which the article is coated. In the form shown in Fig. 5 the two sections have perforated crowns or body parts as before, but instead of having rims arranged flatwise, the rims $b'$ are arranged to telescope one over the other. The two sections are treated and secured together with waterproof, heat-proof, cementitious matter as before.

If desired a flexible suspension member may be secured to the tea ball, by which it may be manipulated. In Figs. 1, 2 and 5 such member consists of a ribbon or tape $c$, the end of which is cemented between the two rims $b$ by the same waterproof material which holds the two sections together. The tape $c$ also serves for labeling the brand of tea if desired. In Figs. 3 and 4 the suspension member consists of a string or cord $c'$ similarly secured between rims of the two sections.

Coated paper tea balls of this character may be put up for sale in the form in which they are ultimately to be used, and may be served very much as a lump of sugar is served. One, or more if desired, may be placed in a cup, and hot or boiling water poured over them as is usual with ordinary metal tea balls. They may be stirred and pressed with a spoon without danger of tearing them or breaking the joint; and will be removed from the cup when the desired strength has been brewed or when it is desired to brew another cup of tea. When used up they may be thrown away, thus eliminating the care and trouble incidental to the use of appliances ordinarily used in making tea.

Such balls are also well adapted for sale in individual sealed packages as well in vending machines as in shops and possess obvious advantages over the sale of tea in bulk.

I claim:

1. A tea ball comprising two sections of fibrous material secured together rim to rim, said sections being coated with a waterproofing, heat-resisting, cementitious substance, and the two sections being cemented together by the same substance which renders the article water-proof and heat-proof.

2. A tea ball comprising two sections of fibrous material secured together rim to rim, said sections being coated with a solution of cellulose acetate by which the sections are not only rendered water-proof and heat-proof but are also cemented one to the other.

3. The method of making a tea ball of two sections of paper or other fibrous material which consists in coating the two sections separately with a waterproofing, heat-resisting, cementitious substance, permitting one of said sections to dry, filling the dry section, applying the other section while wet to the filled dry section, and permitting the assembled article to dry.

4. A tea ball comprising two sections of fibrous material secured together rim to rim, said sections being coated with a waterproofing, heat-resisting, cementitious substance, and the two sections being cemented together by the same substance which renders the article water-proof and heat-proof, and a flexible suspension member secured by said cementing substance between the rims of the two sections.

Signed by me at Boston, Massachusetts, this 7th day of November, 1916.

FRANCIS W. TULLY.